US012603221B2

(12) United States Patent
Frisvold et al.

(10) Patent No.: US 12,603,221 B2
(45) Date of Patent: Apr. 14, 2026

(54) LOW-EMI TRANSFORMER

(71) Applicant: Ezone Energy AS, Oslo (NO)

(72) Inventors: Erlend Frisvold, Randaberg (NO); Erik Kjelland Svanes, Stavanger (NO)

(73) Assignee: Ezone Energy AS, Oslo (NO)

( * ) Notice: Subject to any disclaimer, the term of this patent is extended or adjusted under 35 U.S.C. 154(b) by 0 days.

(21) Appl. No.: 18/693,597

(22) PCT Filed: Aug. 22, 2022

(86) PCT No.: PCT/NO2022/050199
§ 371 (c)(1),
(2) Date: Mar. 20, 2024

(87) PCT Pub. No.: WO2023/048575
PCT Pub. Date: Mar. 30, 2023

(65) Prior Publication Data
US 2025/0140471 A1 May 1, 2025

(30) Foreign Application Priority Data
Sep. 23, 2021 (EP) .................................... 21198623

(51) Int. Cl.
*H01F 27/36* (2006.01)
*H01F 30/04* (2006.01)
*H01F 30/12* (2006.01)

(52) U.S. Cl.
CPC ............. *H01F 27/36* (2013.01); *H01F 30/04* (2013.01); *H01F 30/12* (2013.01)

(58) Field of Classification Search
CPC .......... H01F 27/36; H01F 30/04; H01F 30/12; H01F 27/40; H01F 27/38; H02M 1/44; H02M 5/12; G05F 1/12
(Continued)

(56) References Cited

U.S. PATENT DOCUMENTS

2014/0184186 A1 7/2014 Glaser
2015/0048916 A1 2/2015 Powell
(Continued)

FOREIGN PATENT DOCUMENTS

CN 103165277 A 6/2013
CN 109643136 A 4/2019
(Continued)

OTHER PUBLICATIONS

PCT/NO2022/050199, International Search Report and Written Opinion, dated Dec. 16, 2022, 11 pages.
(Continued)

*Primary Examiner* — Tuyen T Nguyen
(74) *Attorney, Agent, or Firm* — Andrus Intellectual Property law, LLP

(57) ABSTRACT

A transformer has: i) a magnetizable core with respective primary and secondary coils; ii) a ground terminal for electrically connecting to an external ground terminal of an electric power grid, and iii) a physical electrical ground node placed at a location within the isolation transformer (**100*e*1**), wherein the physical electrical ground node is electrically connected to the ground terminal. The transformer has: iv) at least two electrically-conductive loops that are placed at different locations in the transformer where a magnetic field may be built up during operational use, and v) a switching circuit configured for sequentially, temporarily and selectively electrically coupling subsets of the electrically-conductive loops with the physical electrical ground node in accordance with a certain sequence and pattern. An isolation transformer may be much less susceptible to EMI without requiring any adaptation of the standards.

18 Claims, 7 Drawing Sheets

(58) Field of Classification Search
USPC .............................................. 336/84 R, 84 C
See application file for complete search history.

(56) References Cited

U.S. PATENT DOCUMENTS

| | | | | |
|---|---|---|---|---|
| 2015/0084733 | A1 | 3/2015 | Sun | |
| 2015/0279551 | A1* | 10/2015 | Heo | H01F 27/36<br>336/84 C |
| 2020/0152366 | A1 | 5/2020 | Frisvold | |
| 2020/0388433 | A1 | 12/2020 | Wong | |

FOREIGN PATENT DOCUMENTS

| | | | | |
|---|---|---|---|---|
| JP | 2007524998 | A * | 8/2007 | H01F 27/363 |
| WO | 2018049520 | A1 | 3/2018 | |
| WO | 2019013642 | A1 | 1/2019 | |

OTHER PUBLICATIONS

Ep21198623, European Search Report dated Mar. 8, 2022, 2 pages.
Office Action issued in Taiwan Patent Application No. 111132090, dated Sep. 30, 2025.
Office Action issued in Chinese Patent Application No. 202280077384.X, dated Jun. 28, 2025.

* cited by examiner

PRIOR ART

PRIOR ART

LOW-EMI TRANSFORMER

CROSS-REFERENCE TO RELATED APPLICATIONS

This application is the U.S. national stage application of International Application No. PCT/NO2022/050199, filed Aug. 22, 2022, which international application was published on Mar. 30, 2023, as WO 2023/048575 A1 in the English language. The International Application claims priority to European Patent Application No. 21198623.7, filed Sep. 23, 2021. The international application and European application are all incorporated herein by reference, in their entirety.

FIELD

The invention relates to a transformer comprising a magnetizable core, at least one primary coil and at least one secondary coil provided around the magnetizable core, a ground terminal for electrically connecting to an external ground terminal of an electric power grid, and a physical electrical ground node placed at a location within the transformer, wherein the physical electrical ground node is electrically connected to the ground terminal. The invention further relates to an electric power system comprising such transformer. The invention also relates to a method for improving performance of an electric or electronic device.

BACKGROUND

Isolation transformers block transmission of the DC components in signals from one circuit to the other, while allowing AC components in signals to pass. Transformers that have a ratio of 1 to 1 between the primary and secondary windings are often used to protect secondary circuits and individuals from electrical shocks between energized conductors and earth ground. Suitably designed isolation transformers block interference caused by ground loops. Isolation transformers with electrostatic shields are used for power supplies for sensitive equipment such as computers, medical devices, or laboratory instruments.

Faraday cages are typically used for blocking electrical fields. An external electrical field causes the electric charges within conducting material (which the cage comprises) to be distributed such that they cancel the field's effect in the interior of the cage. This phenomenon is used to protect sensitive electronic equipment within the cage from external radio frequency interference (RFI). Faraday cages are also used to enclose devices that produce RFI themselves, such as radio transmitters. The Faraday cage then prevents the radio waves from interfering with other nearby equipment outside the respective cage. In the case of varying electromagnetic fields, it applies that the faster the variations are (i.e., the higher the frequencies), the better the material resists magnetic field penetration. In such case the shielding also depends on the electrical conductivity, the magnetic properties of the electrically-conductive materials used in the cages, as well as their thicknesses.

The problem with the above-mentioned known isolation transformers is that they still suffer from a lot of electric magnetic interference (EMI) when used in accordance with the international standards for connecting isolation transformers. The noise levels can even be an order of magnitude higher than the prescribed maximum allowable levels. Thus, there is a clear need for a further improvement of isolation transformers. The most relevant international standard is "2011 NEC" which refers to the UL, CSA and NEMA standards (NEMA ST-20).

The current inventor earlier proposed in WO 2019/013642 a low-EMI transformer comprising: i) a Faraday cage comprising a magnetic core and at least one primary coil and at least one secondary coil; ii) input terminals connected to the at least one primary coil via input wires; iii) output terminals connected to the at least one secondary coil via output wires, iv) and an input ground terminal for connecting to the Faraday cage and an output ground terminal connected to the Faraday cage for further connection to a further circuit to be connected to the isolation transformer. The isolation transformer in WO 2019/013642 further comprises: v) a clean ground input terminal for receiving an external clean ground; vi) a clean ground output terminal for connecting to a further clean ground input terminal of the further circuit, and vii) a physical electrical node placed at a location within the Faraday cage where the magnetic flux and electric field are the lowest, preferably close to zero. The clean ground input terminal is electrically fed into the isolation transformer and connected to the physical electrical node through a first electric connection. Furthermore, the physical electrical node is further electrically connected to a clean ground output terminal through a second electric connection.

An important feature of the transformer in WO 2019/013642 is that the transformer is provided with a separate (extra) input terminal for receiving a clean ground and a separate (extra) output terminal for supplying a clean ground to the further circuit, whereas in the earlier prior art solutions all grounds are connected to each other, i.e., there is no separate low-EMI ground. The (normal) input ground terminal is connected to the Faraday cage, which may be further connected to other Faraday cages of other circuitry, which as such is also the case for the earlier prior art solutions. The clean ground input terminal is fed to the physical electrical node, from which it is further fed towards the clean ground output terminal. The inventor discovered that the placement of this physical electrical node is very critical, i.e., that it must be placed where there is the least magnetic flux and the lowest electric field. Furthermore, the ideal position of the physical electrical node is also dependent on the load of the transformer in that the load determines the internally created electric and magnetic fields. Furthermore, the clean ground output terminal is, in operational use, fed to a further clean ground input of the further circuit. The first electric connection and the second electric connection are preferably placed such that EMI generation is minimized in these connections, for example by using shielded wires and by making the wires run parallel with other signal carrying conductors. In addition, the first and second electric connections must have a low-impedance, not only at low frequencies, but also at high frequencies. By taking these technical measures the transformer in WO 2019/013642 provides for a transformer where EMI that is generated in the further circuit will be fed back to the transformer through the low-impedance clean ground connection instead of through the high-impedance ground connections which creates a lot of noise in the supply voltage of the further circuit, but also in the circuitry and components connected to the further circuit. The consequence of the combination of the above-mentioned features is an isolation transformer that is much less susceptible to EMI than the isolation transformers as known from the earlier prior art.

However, a possible drawback with the transformer in WO 2019/013642 is that it requires an adaptation of the international standards for connecting isolation transformers. This may form a threshold or at least a delay in the commercialisation of this fantastic product.

In addition, another drawback with the transformer in WO 2019/013642 is that it requires a certain amount of infield calibration and application dependent adjustment and requires a lot of knowledge about electromagnetism.

Hence there is a need to further develop the low EMI transformer in order to resolve these problems.

SUMMARY

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

In a first aspect the invention relates to a transformer comprising:

- a magnetizable core;
- at least one primary coil and at least one secondary coil provided around the magnetizable core;
- a ground terminal for electrically connecting to an external ground terminal of an electric power grid, and
- a physical electrical ground node placed at a location within the transformer, wherein the physical electrical ground node is electrically connected to the ground terminal.

The transformer further comprises:

- at least two electrically-conductive loops that are placed at different locations in the transformer where a magnetic field may be built up during operational use, and
- a switching circuit for sequentially, temporarily, and selectively electrically coupling subsets of the electrically-conductive loops with the physical electrical ground node in accordance with a certain sequence and pattern.

The effects of the transformer in accordance with the invention are as follows.

An important feature of the invention is that it must be noted, however, that the invention does not require an adaptation of the international standards for electrically connecting transformers to power grids and loads. On the outside the transformer has the conventional input and output terminals as well as the ground terminal. Yet on the inside the transformer has some special features that are explained below.

The first feature concerns the provision of at least two electrically-conductive loops that are placed at different locations in the transformer where a magnetic field may be built up during operational use. There are different locations suitable for such placement as the various embodiments will show, yet what is important is that the electrically-conductive loops are intentionally placed where a magnetic field build-up is expected, that is where in fact EMI is expected to be built up. This is contrary to the placement of the physical electrical node in WO 2019/013642, which was intentionally placed where this field is determined or expected to be lowest.

The second feature concerns the provision of a switching circuit that is configured for sequentially, temporarily, and selectively electrically coupling subsets of said electrically-conductive loops with the physical electrical ground node in accordance with a predefined sequence and pattern. In the most basic form, where there are two electrically-conductive loops this implies that the loops are alternatingly electrically connected with the physical electrical ground node. The inventor got the following insight. By sequentially, temporarily, and selectively electrically coupling subsets of said electrically-conductive loops with the physical electrical ground node EMI is effectively "caught" by the loops and subsequently led away to the physical electrical ground node when the respective loop is subsequently coupled with the physical electrical ground node. In this way EMI is prevented from being built up and electric performance is improved. Expressed differently, the transformer does not get the chance to build up a lot of magnetic field, because this field is caught by the electrically-conductive loops and any induced current (EMI) is led away to the physical electrical ground node. The inventor discovered that this leads to an averaging out of the EMI, but also less heat and thereby a higher power factor of the transformer. Power factors as high as about 0.9 have been achieved so far, whereas without the invention these power factors were down to about 0.4. It appeared to be possible to achieve a Total Harmonic Distortion (THD) below 8%, which is a requirement for isolation transformers that was released recently in international standard IEC61000.

Another huge advantage of the invention is that the placement of the physical electrical node is no longer so critical, i.e., it may be placed at a location where there is a bit of magnetic flux and electrical field.

Besides having a much larger power factor the transformer according to the invention also has the great advantage that it no longer requires infield calibration or adjustment. The transformer effectively calibrates itself no matter the load even if the load is not properly balanced. In addition, the transformer does not comprise any moving parts for adjustment or calibration. These are profound advantages of the invention obtained by catching EMI using electrically conductive loops and leading it away to the physical electrical node. Instead of minimizing the EMI as is done in WO 2019/013642 by manipulation of the position of the physical electrical ground node, the current invention tolerates EMI that is built up and just leads it away to this node such that it averages/fades out. This is quite a revolutionary thought.

In order to reach the desired effect, it is not necessary to keep the loops continuously connected with the physical electrical ground node. There may be several and actually large time intervals when none of the loops are connected with the physical electrical ground node. Many variations of the respective sequence and pattern are possible. The inventors have experimented a lot with finding the best working embodiment.

In order to facilitate understanding of the invention one or more expressions, used throughout this specification, are further defined hereinafter.

Wherever the wording "coil" is used, this is to be interpreted to be a winding (at least one) of a conductor formed such that an inductance is formed.

Wherever the wording "electrically-conductive loop" is used, this is to be interpreted to be a winding (at least one) of a conductor formed such that an inductance is formed.

Whenever the wording "Faraday cage" is used, this is to be interpreted as an enclosure used to block electromagnetic fields. A Faraday shield may be formed by a continuous covering of electrically-conductive material or in the case of a Faraday cage, by a mesh of such materials. Faraday cages are named after the English scientist Michael Faraday, who invented them in 1836.

In an embodiment of the transformer in accordance with the invention the at least two electrically-conductive loops comprise at least three electrically-conductive loops. The more loops are placed the better averaging out of the EMI can be obtained, but also the more switches between loops can be made such that EMI buildup is even further reduced.

In an embodiment of the transformer in accordance with the invention the at least two electrically-conductive loops comprise at least six electrically-conductive loops. The more loops are placed the better averaging out of the EMI can be obtained, but also the more switches between loops can be made such that EMI buildup is even further reduced. This embodiment is discussed in more detail in the detailed description.

In an embodiment of the transformer in accordance with the invention the least two electrically-conductive loops are placed in spaces between the coils. Whereas in WO 2019/013642 it was important to place the physical electrical ground node in a location where no or little magnetic field or electrical field is present, this literally is a non-issue in the current invention as far as the placement of the electrically-conductive loops are concerned. It was found that the space between respective coils can be conveniently used for placing the electrically-conductive loops. These spaces are conventionally minimized in transformers for compactness, yet these spaces are quite usable for the current invention. In case the transformer is a three-phase transformer having three legs and respective openings in the core between them, each leg having a respective primary and secondary coil, the spaces between the coils within these openings can be conveniently used. This is further explained with reference to the drawings.

In an embodiment of the transformer in accordance with the invention the at least two electrically-conductive loops are integrated in a plate or multiple plates being laminated with a material that is permeable to magnetic fields and electrically insulating. As the loops are electrically-conducive as well as the coils, it is advantageous to implement these loops in a respective plate or multiple plates being laminated with a material that is permeable to magnetic fields and electrically insulating. Example of materials which may be selected are carbon, Teflon™, rubber, plastic, fibreglass, and the like.

In an embodiment of the transformer in accordance with the invention the subsets of said electrically-conductive loops constitute pairs of electrically-conductive loops. For instance, in case of the presence of six electrically-conductive loops, one might pair up the first loop with the fourth loop, the second loop with the fifth loop, and the third loop with the sixth loop.

In an embodiment of the transformer in accordance with the invention the certain sequence and pattern covers substantially all electrically-conductive loops. Even though it is not essential to use all loops it still provides for the best averaging effect and provides for the most efficient use of resources.

In an embodiment of the transformer in accordance with the invention the certain sequence and pattern constitutes predefined order of selection of subsets of electrically-conductive loops. The predefined order may be chosen based upon the location of the respective loops in the transformer, i.e., choosing the order which results in best averaging.

In an embodiment of the transformer in accordance with the invention the certain sequence and pattern constitutes a random order of selection of subsets of electrically-conductive loops. This may constitute a convenient solution in certain applications.

In an embodiment of the transformer in accordance with the invention the magnetizable core is floating and electrically isolated from all externally-accessible parts of the transformer. The inventors discovered that the performance of the transformer is significantly improved when the magnetizable core is floating and kept electrically isolated from all externally-accessible parts of the transformer. Experiments showed that the performance of the transformer is greatly improved when the magnetizable core is disconnected from the ground terminal and kept electrically floating. A possible explanation of this is that the impedance of the ground network is much better defined when the core is floating.

An embodiment of the transformer in accordance with the invention comprises three sets of coils, each set comprising at least one primary coil and at least one secondary coil for forming a three-phase transformer. This group of embodiments may have the largest applicability in the field. Yet, the invention is not limited to three-phase transformers.

In an embodiment of the isolation transformer in accordance with the invention the magnetizable core comprises at least three legs, at least one for each pair of primary and secondary coils.

An embodiment of the isolation transformer in accordance with the invention further comprises a Faraday cage in which the magnetizable core, the respective coils and the at least two electrically-conductive loops are placed, wherein the Faraday cage is electrically connected with the physical electrical ground node.

In a second aspect the invention relates to an electric power system comprising:

- terminals for coupling with an electric power grid;
- a dedicated earthing for forming an external ground terminal;
- a power supply network comprising all necessary cabling, electric contacts and plugs; and
- the transformer according to any one of the preceding claims, wherein the input terminals of the transformer are electrically connected with the power supply network, and wherein the ground terminal of the transformer is electrically connected to the dedicated earthing.

The inventors realized that the technical effects of the invention are further improved when a dedicated earthing is used for electrical connection with the ground terminal of the transformer instead of using the default earthing of the electric power grid. In this way it is obtained that the transformer starts with a clean ground avoiding that any EMI or other noise on the power grid terminals is fed into the transformer.

In a third aspect the invention relates to a method for improving performance of an electric device or electronic, the method comprising steps of:

- placing at least two electrically-conductive loops at different locations in the device where a magnetic field may be built up during operational use of the device, and
- sequentially, temporarily and selectively electrically coupling subsets of the electrically-conductive loops to a physical electrical ground node in accordance with a certain sequence and pattern.

The invention has a much broader applicability than (isolation) transformers. EMI is a general problem that may occur in virtually any electric device or apparatus. The method in accordance with claim 15 serves to cover all these applications. It goes without saying that all embodiment of the transformer that are related to the number of electrically-conductive loops, their placement, AND their sequential, temporal, and selective electrical connection with the physical electrical ground node in accordance with the certain sequence and pattern, have their equivalent embodiments of the method of the invention.

BRIEF DESCRIPTION OF THE DRAWINGS

In the following is described examples of embodiments illustrated in the accompanying drawings, wherein.

DETAILED DESCRIPTION OF THE EMBODIMENTS

Figure 1:
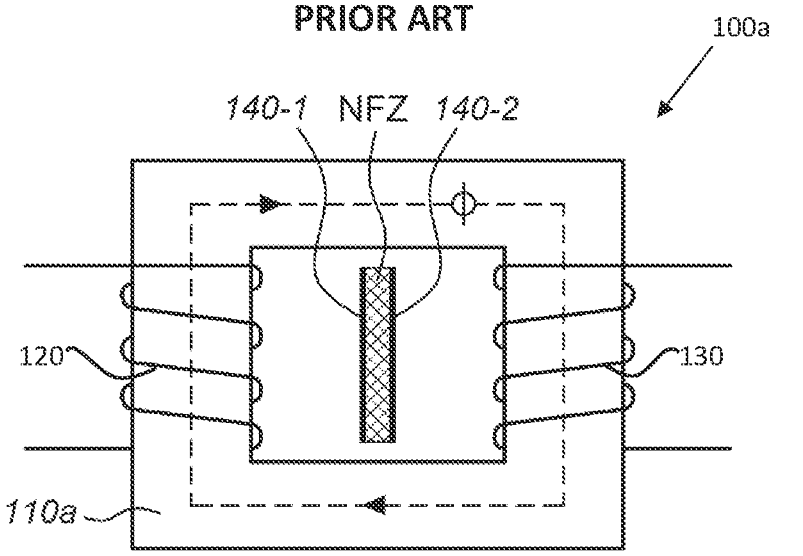
Fig. 1 PRIOR ART
FIGS. 1-4 illustrate different types of transformers of the prior art illustrating where a no-field zone could be implemented as previously presented in the prior art.

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming. Nevertheless, it would be a routine undertaking for those of ordinary skill in the art having the benefit of this disclosure.

The present subject matter will now be described with reference to the attached figures. Various systems, structures and devices are schematically depicted in the drawings for purposes of explanation only and so as not to obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

When the demands of transformers are higher, typically an isolation transformer is used. Isolation transformers block transmission of the DC-component in signals from one circuit to the other, while allowing AC-components in signals to pass. Transformers that have a ratio of 1-to-1 between the primary and secondary windings are often used to protect secondary circuits and individuals from electrical shocks between energized conductors and earth ground. A known way of tackling noise caused by EMI is to build expensive and complex filters to subdue the noise actively.

It was realized in WO 2019/013642 that the problem is in fact worsened by the way isolation transformers are built and used. It was realized that the problem is often caused by the fact that all ground terminals are simply connected together without people realizing that such connection worsens the amount of ground loops induced in the systems. In other words, the grounding in the traditional way of building and using isolation transformers is hardly effective, i.e., more problems are created than there are solved.

The first improvement in WO 2019/013642 concerns the design of the isolation transformer. As a first step the isolation transformer of the invention is provided with a separate electrical ground node provided inside the Faraday cage at a position where the magnetic flux and electric field are substantially zero. The main idea by this separate ground node is to keep it as clean as possible, but also to keep the impedance to this separate ground node as low as possible. In case it would be placed at a location where there is significant magnetic and/or electric field, the separate electrical ground node would catch unwanted signals again (act as an antenna).

FIGS. 1-4 illustrate different types of transformers of the prior art illustrating where a no-field zone could be implemented as previously presented in the prior art.

The transformer in FIG. 1 is a 1-phase (it is commonly called 1-phase, but it is actually two phases) transformer 100*a* with an O-shaped core 110*a*. The O-shaped core 110*a* is for guiding the magnetic flux Φ from a primary coil 120 to a secondary coil 130 and vice versa as illustrated. The primary coil 120 and the secondary coil 130 are each provided around a respective leg of the O-shaped core 110*a*. The potential difference between the two input phases is called the input voltage Va and the potential difference between the two output phases is called the output voltage Vb.

Figure 2:
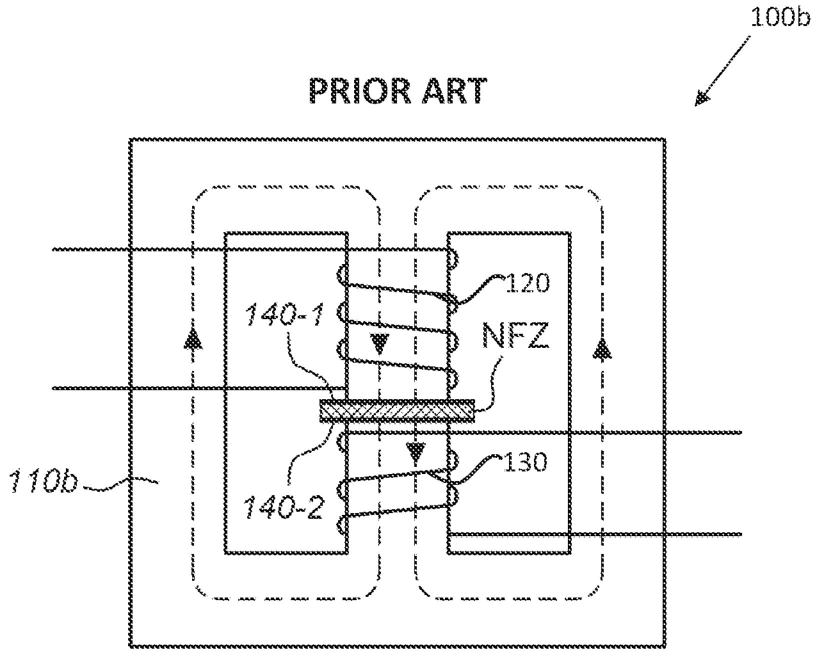

FIG. 2 shows a different 1-phase transformer 100*b* with a so-called three-limb core 110*b*. Both the primary coil 120 and the secondary coil 130 are provided around the middle limb of the core 110*b* as illustrated.

Figure 3:
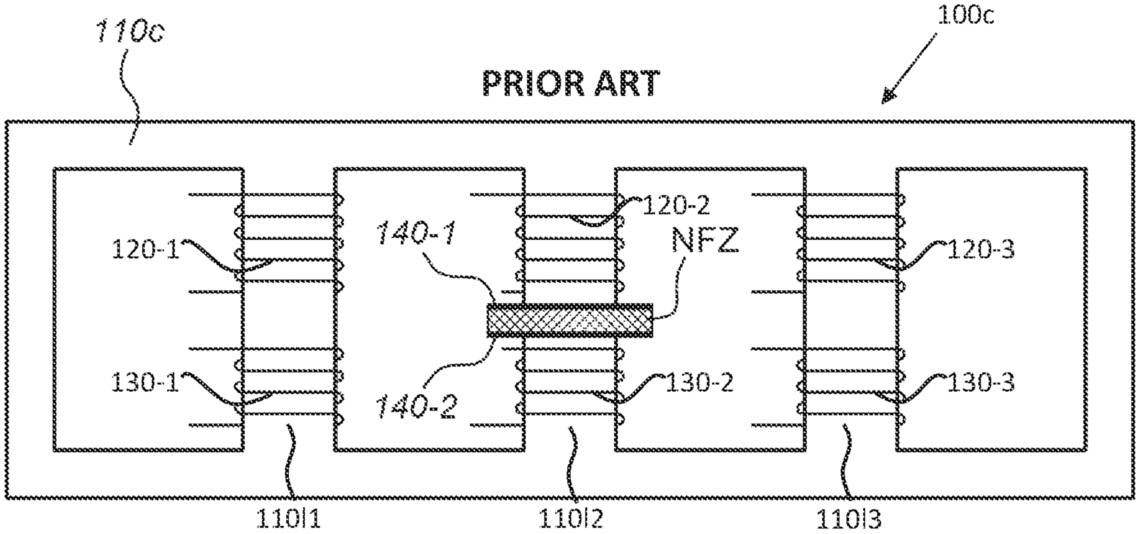

FIG. 3 shows a so-called 3-phase transformer 100*c*. In this type of transformer each phase has a respective primary coil 120-1, 120-2, 120-3 and a respective secondary coil 130-1, 130-2, 130-3 as illustrated. Such coils may be connected in a star form or in a delta form as is commonly known in the art. The figure also illustrates how the magnetizable core 110*c* has five limbs (or legs) of which three have been provided with the respective coils 120-1 . . . 120-3, 130-1, 130-3.

In FIGS. 1-3 possible no-field zones (or low-field zones) NFZ are illustrated as proposed in WO 2019/013642. In each of the examples the no-field zones (or low-field zones) NFZ are formed in between said two-electrostatic shields 140-1, 140-2 (meaning substantially no electric field) and outside the respective magnetic cores 110*a*, 110*b*, 110*c* (meaning substantially no magnetic field).

Figure 4:
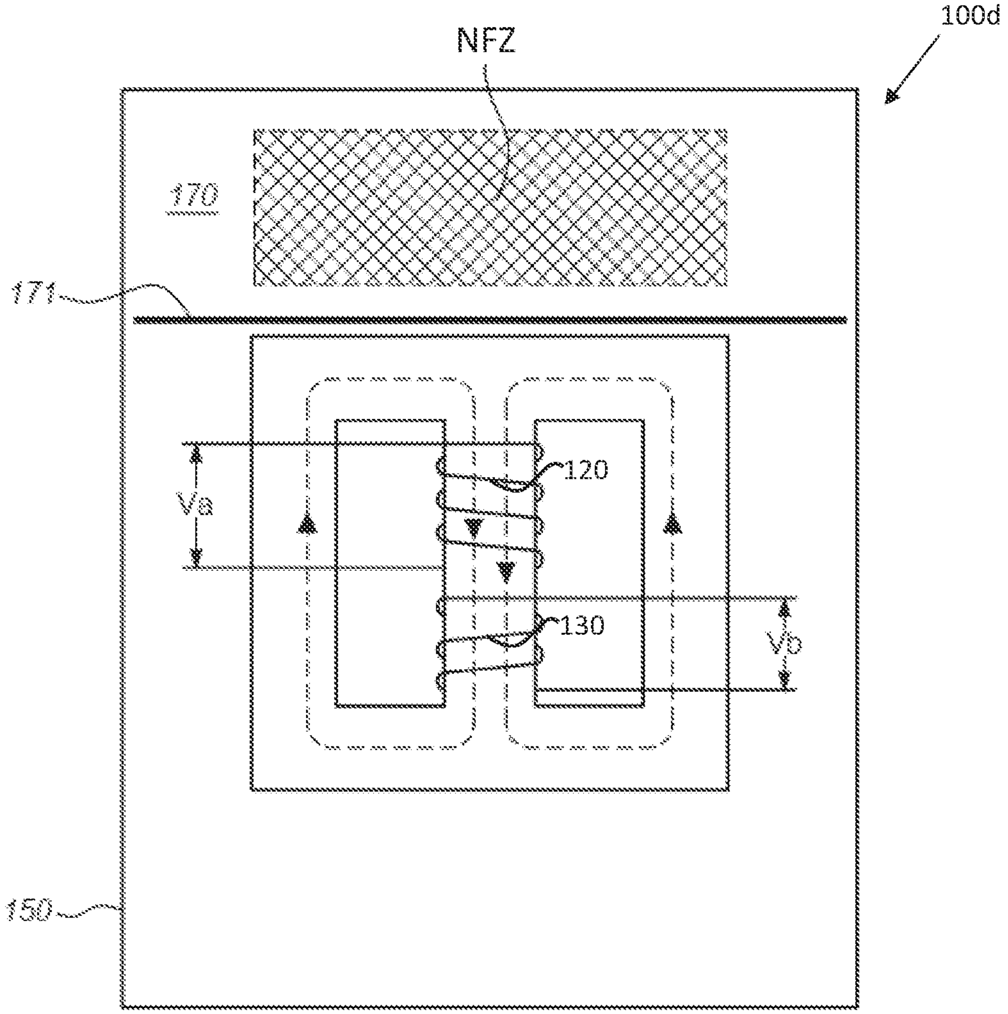

FIG. 4 illustrates a different embodiment of the transformer 100*d*. Instead of providing the further electrical ground node in between said coils, it is now implemented in a further Faraday cage 170 that is manufactured inside the Faraday cage 150 of the isolation transformer 100*d*. The Faraday cage 150 comprises the respective primary coil 120 and the secondary coil 130, wherein the primary coil 120 is provided with the input voltage Va and the secondary coil 130 provides the output voltage Vb, as illustrated. By implementing this further Faraday cage 170, a so-called no-field zone NFZ (or low-field zone) can be established, even if the transformer itself creates a certain electrical and magnetic field. Instead of making a fully enclosed Faraday cage it may suffice to only implement a Faraday shield 171 inside the Faraday cage 150 thus effectively defining the further Faraday cage 170. Inside the no-field zone NFZ the earlier mentioned further electrical ground node can be implemented.

The invention concerning the improved low-EMI transformer as presented in this specification may be applied using any type of transformer design or core design, including those illustrated in FIGS. 1-4.

Figure 5:
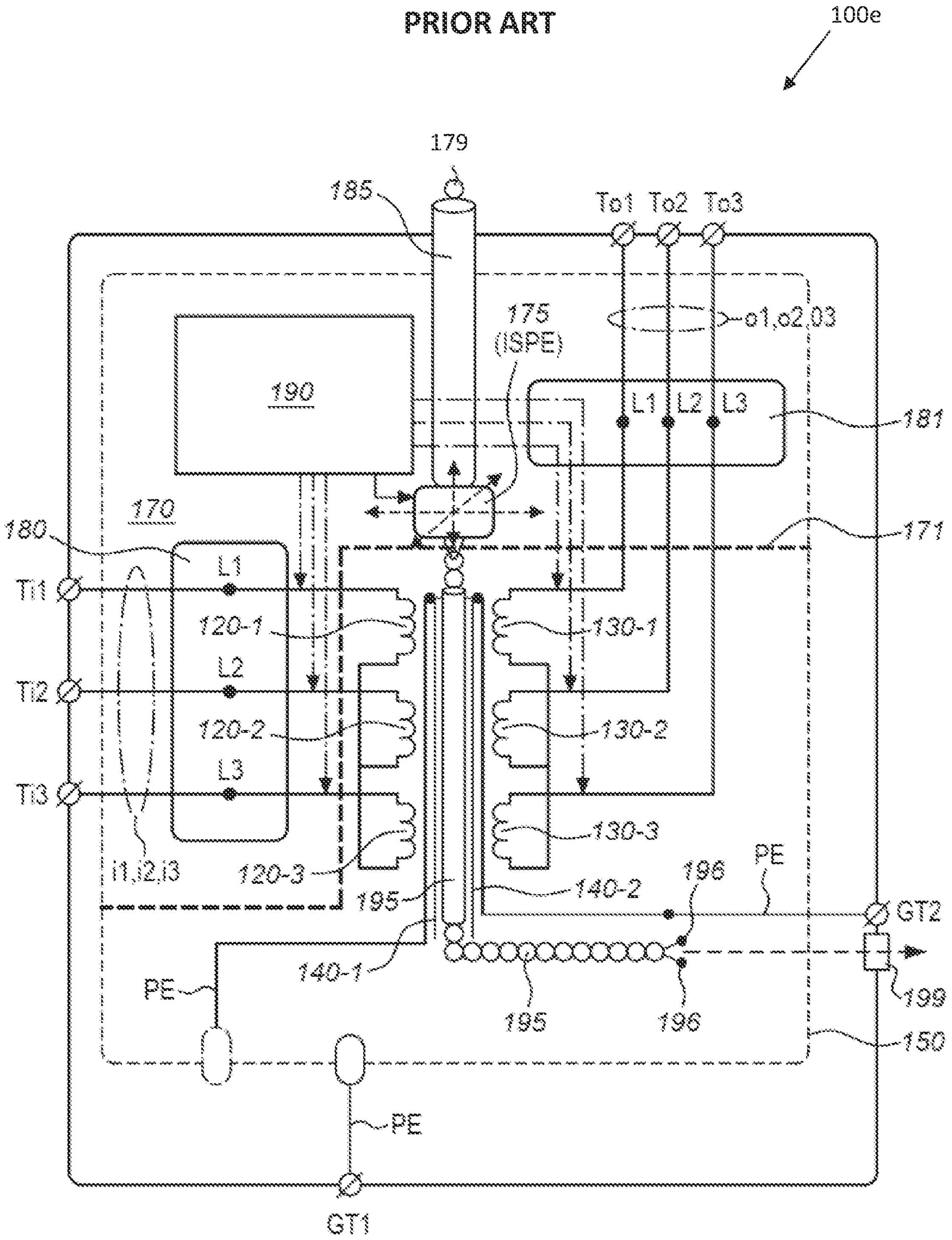
FIG. 5 shows a low-EMI transformer of the prior art yet suffering from a certain drawback.

FIG. 5 shows a low-EMI transformer 100*e* of the prior art yet suffering from a certain drawback. The transformer 100*e* is a three-phase isolation transformer (the three phases are conventionally called L1, L2 and L3) having three input terminals Ti1, Ti2, Ti3 that are fed via respective input wires i1, i2, i3 via a first isolated junction box 180 to respective primary coils 120-1, 120-2, 120-3 that are connected in a star network in this embodiment. The secondary coils 130-1, 130-2, 130-3 are connected to respective output terminals To1, To2, To3 via respective output wires o1, o2, o3 via a second isolated junction box 181. The secondary coils 130-1, 130-2, 130-3 are also connected in a star network in this embodiment. It must be noted however that also other types of networks may be used, such as the delta network, either on the input side, on the output side or on both sides of the transformer. This is all dependent on the type of electric grid to which the transformer is coupled and on the type of electric grid that needs to be generated by the transformer.

Furthermore, there is the earlier-mentioned Faraday cage 150 as illustrated, which is connected to the input ground terminal GT1 (and thus to ground PE). The Faraday cage 150 is also connected to the electrostatic shields 140-1, 140-2 and further to the ground output terminal GT2 to be connected to further circuits. So far, all mentioned parts in FIG. 5 are conventional for isolation transformers.

What renders the isolation transformer 100*e* of FIG. 5 special is that there is provided a physical electrical node 175 inside a further Faraday cage 170 (defining the earlier discussed no-field (or low-field) zone NFZ) within the Faraday cage 150 that is defined by a Faraday shield 171 as illustrated. The physical electrical node 175 is connected to a clean ground input terminal 179 via a first electric connection 185 (for instance a double isolated cable, which is typically used before the earth-leakage circuit breaker in an electric system of a house-hold). The physical electrical node 175 is further connected to a clean ground output terminal 199 via a second electric connection 195. The second electric connection 195 in this embodiment constitutes a twisted-pair shielded cable comprising two wires 196 that are intertwined as illustrated. Each of said wires 196 is connected to the physical electrical node 175 and fed to the clean ground output terminal 199 as illustrated. In FIG. 5 the second electric connection 195 is drawn as running parallel with and in between said electrostatic shields 140-1, 140-2, but that is not essential. In fact, the second electric connection 195 may alternatively be fed out of the isolation transformer 100*e* parallel to said output wires o1, o2, o3 for instance.

FIG. 5 further illustrates a sensor and controller circuit 190 (CPU) that is configured for measuring noise on said inputs and outputs as illustrated by the arrows and eventually controlling the position of said physical electrical node 175 to minimize the electric field and magnetic fields experienced by this node for reducing/minimizing the noise. In the embodiment of FIG. 5 the position of said physical electrical node 175 is controllable as illustrated by said arrows.

When the transformer 100*e* of FIG. 5 is properly investigated it can be easily observed that this transformer is not a conventional transformer because on the outside it has two different type of ground terminals, namely the conventional ground terminals GT1, GT2 for being connected with the conventional ground potential PE, and the special clean ground terminals 179, 199, which serve to be connected with a separate ground potential, which also is being referred to as ISPE in WO 2019/013642. In other words, this low-EMI transformer does not follow the standard for connection isolation transformers and requires a new standard as was properly explained in the same document. This is as such not a problem but may prevent rapid commercialisation of the transformer. This resulted in an identified need for a further improved low-EMI transformer as will be explained with reference to FIGS. 6-13.

Figure 6:
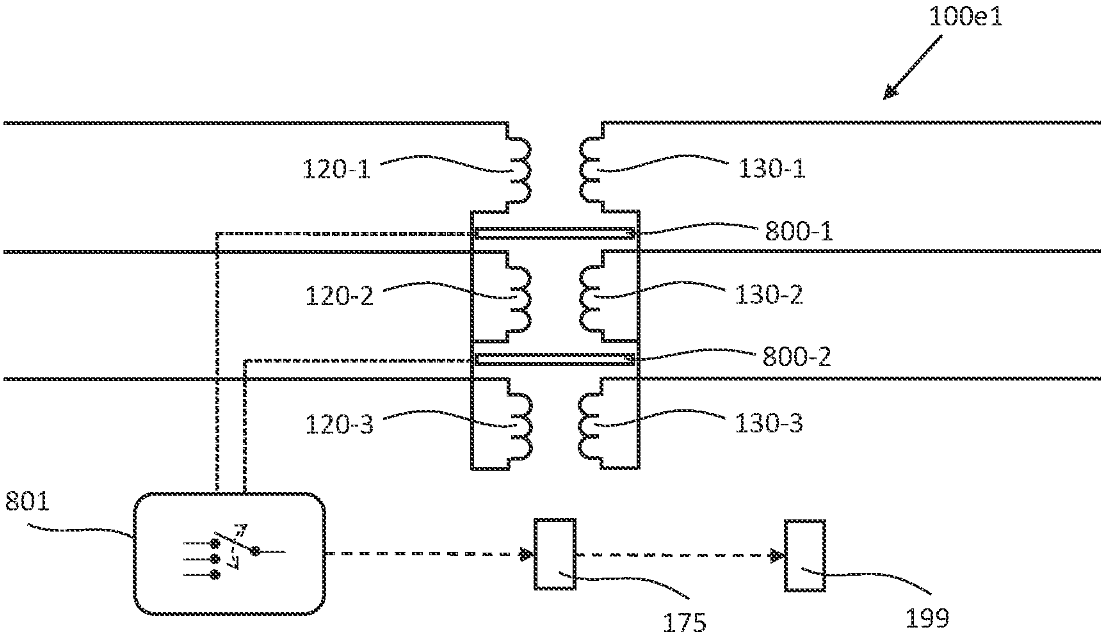
FIG. 6 shows a first embodiment of an improved low-EMI transformer in accordance with the invention.

FIG. 6 shows a first embodiment of an improved low-EMI transformer 100*e*1 in accordance with the invention. This figure only shows some parts of the transformer and in a schematic manner. The respective primary and secondary coils 120-1 . . . 120-3, 130-1 . . . 130-3 each form a star network. In between the coils of the primary phase and the secondary phase there is provided a first plate 800-1. Similarly, in between the coils of the secondary phase and the third phase there is provided a second plate 800-2. These plates 800-1, 800-2 perform the role of so-called EMI catchers as will be explained hereinafter. Said plates comprise material that is permeable to magnetic fields and at the same time electrically insulating. Example materials are carbon, Teflon™, rubber, and the like. Both plates comprises respective electrically-conductive loops (not visible in FIG. 6) which are electrically connected with a switching circuit 801 as illustrated. The switching circuit 801 is configured for sequentially, temporarily, and selectively electrically coupling subsets of the electrically-conductive loops to a physical electrical ground node 175 as shown. What this means will be further explained with reference to other drawings. The physical electrical ground node 175 is on its turn electrically connected with a ground output terminal 199. In the remaining drawings the physical electrically ground node 175 and the ground output terminal 199 are drawn as one component (for simplicity), because these two electric nodes carry the same potential.

It must be stressed that the plates 800-1, 800-2 mainly serve to hold the loops in place. There could be any number of plates, each plates have any number of loops, yet in the current description the principle of the invention is explained with two plates, each embodying three loops. This is further explained in FIG. 7.

Figure 7:
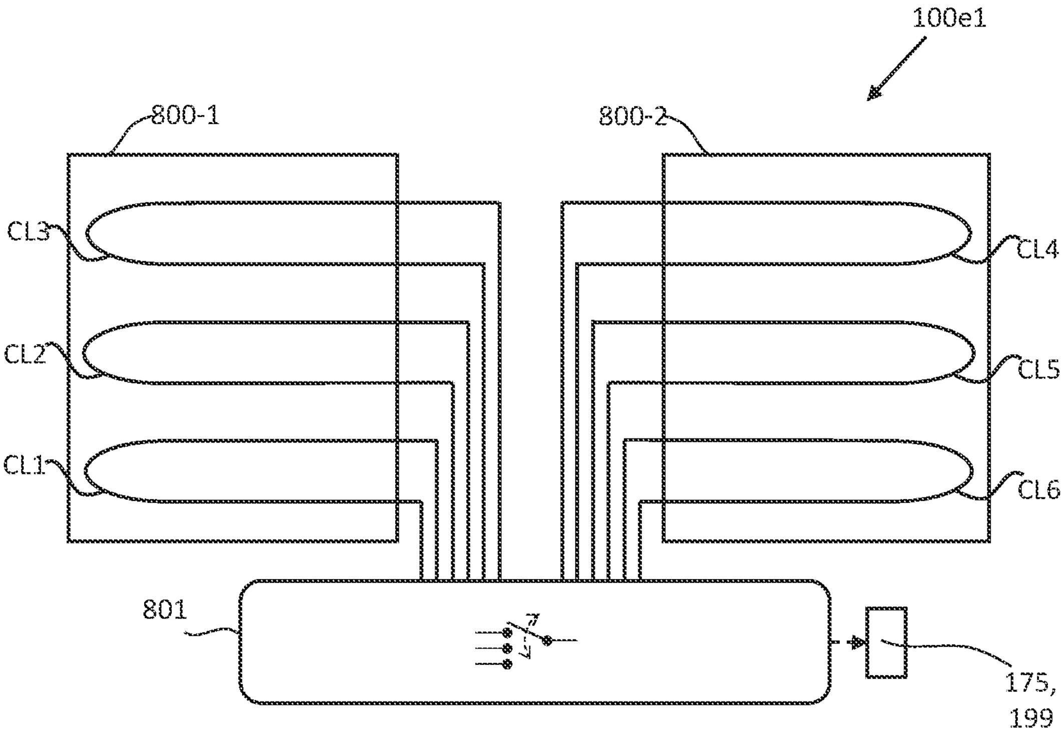
FIG. 7 shows some further aspects of the low-EMI transformer of FIG. 6.

FIG. 7 shows some further aspects of the low-EMI transformer 100*e*1 of FIG. 6. This figure illustrates the earlier-mentioned electrically-conductive loops CL1 . . . .

CL6. In this embodiment, the first plate 800-1 comprises three loops CL1, CL2, CL3 and the second plate 800-2 comprises also three loops CL4, CL5, CL6. All loops by nature have two terminals, which both are fed to the switching circuit 801 as illustrated.

Figure 8:
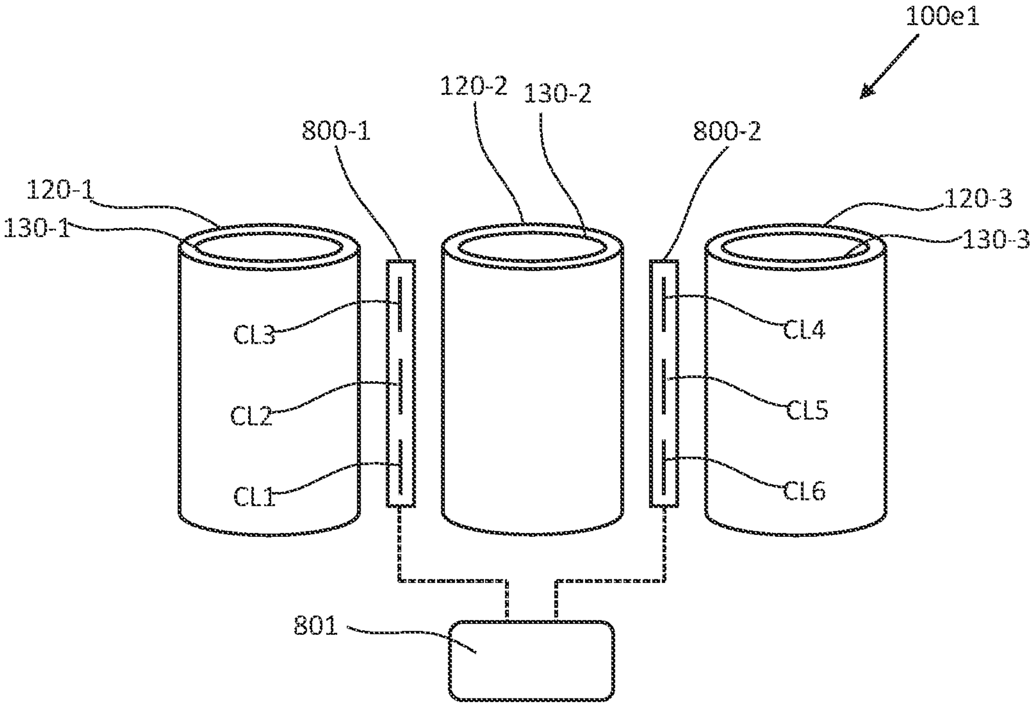
FIG. 8 shows yet further aspects of the low-EMI transformer of FIG. 6.

FIG. 8 shows yet further aspects of the low-EMI transformer 100*e*1 of FIG. 6. In this figure it is illustrated how the plates 800-1, 800-2 could be placed in between the respective phases of the transformer 100*e*1. The magnetizable core is not drawn in this figure to facilitate understanding of this drawing. It must be noted that more plates could have been added. For instance, on all sides of the phases, including the front side, the back side, as well as the far left and the far right in the drawing.

Figure 9:
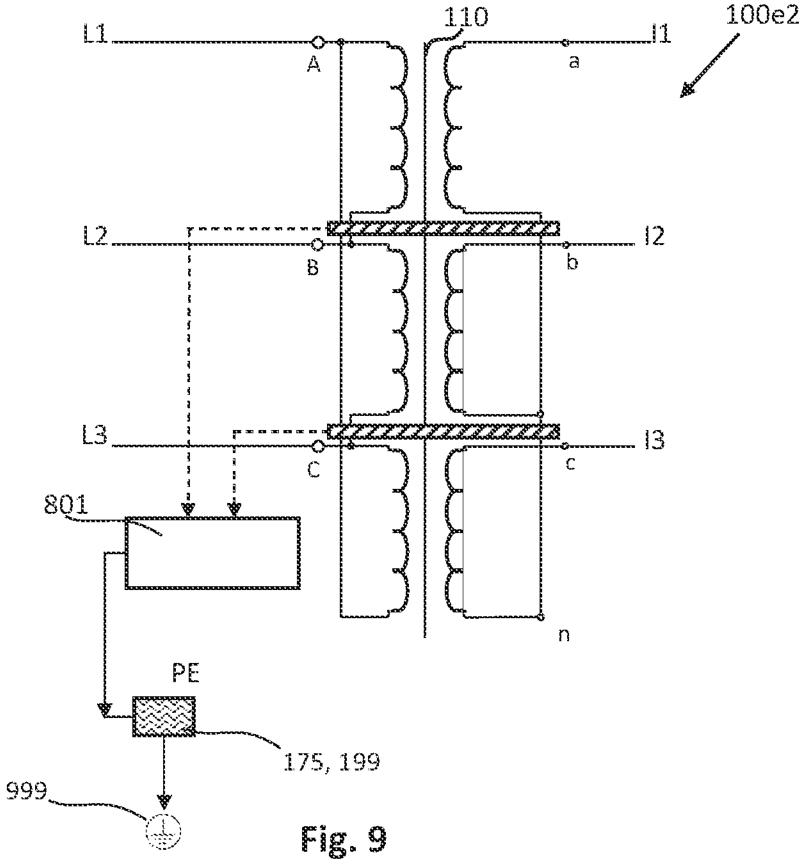
FIG. 9 shows a second embodiment of the low-EMI transformer of the invention together with some further aspects of the invention.

FIG. 9 shows a second embodiment of the low-EMI transformer 100*e*2 of the invention together with some further aspects of the invention. This embodiment differs from the previous embodiment in that the primary side of the transformer 100*e*2 is now connected as a delta network. Certain countries, including Norway, still offer a 230V-delta network power grid in many regions. The current embodiment conveniently transforms this network in a 230V star network, effectively offering 400V voltage between the phase outputs I1, I2, I3 on the secondary side. The star point n on the secondary side is not connected in this embodiment. FIG. 9 further schematically illustrates the magnetizable core 110, which in this embodiment is kept floating.

In operational use of the transformer 100*e*2 the physical electrical ground node 175 is connected with the external ground terminal 999, which typically is connected with an earthing (for example connected to an earth rod or ground spear).

Figure 10:
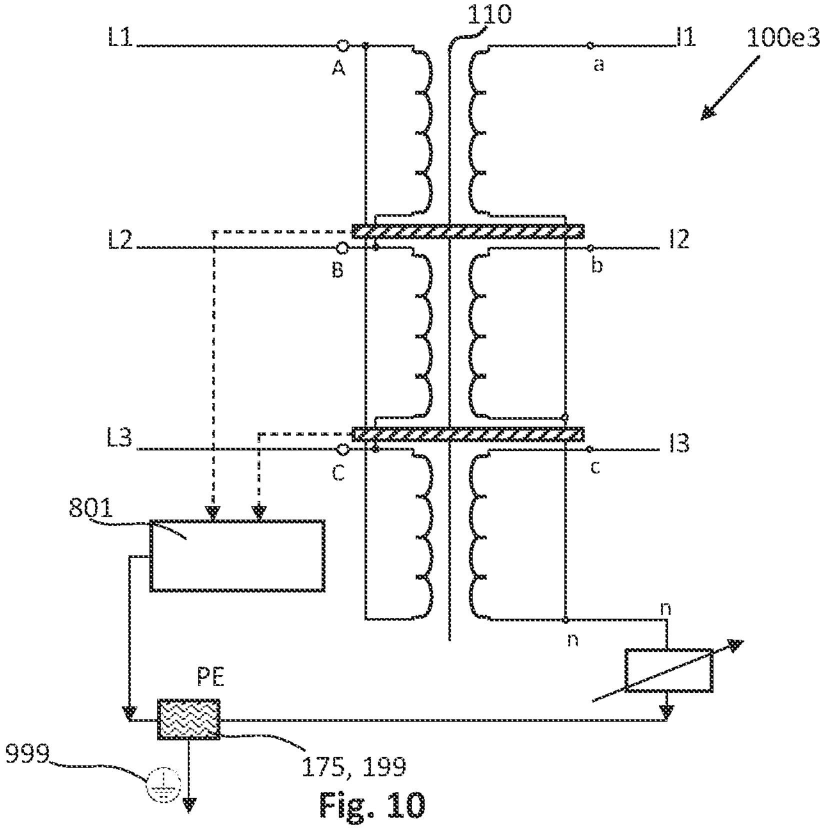
FIG. 10 shows a third embodiment of an improved low-EMI transformer in accordance with the invention.

FIG. 10 shows a third embodiment of an improved low-EMI transformer 100*e*3 in accordance with the invention. This embodiment differs from the previous embodiment in that the star point n of the star network on the secondary side of the transformer 100*e*3 is connected to the physical electrical ground node 175 as well. It must be noted that the star point n in a perfectly balanced situation does not carry any signal and any electrical conductor connected to this star point n would not conduct any current. However, in case of unbalance this may happen. The invention provides for a strong reduction of EMI in the transformer and thereby has as additional technical effect a better balancing of the load. It is because of this effect that the invention enables that the star point n may be connected to the physical electrical ground node 175. Alternatively, the neutral may be left unconnected or it may be controlled by regulating an impedance to ground PE as illustrated by the box. This aspect concerning the neutral terminal n on the secondary side of the transformer 100*e*2 applies to all illustrated embodiments in FIGS. 9-11.

Figure 11:
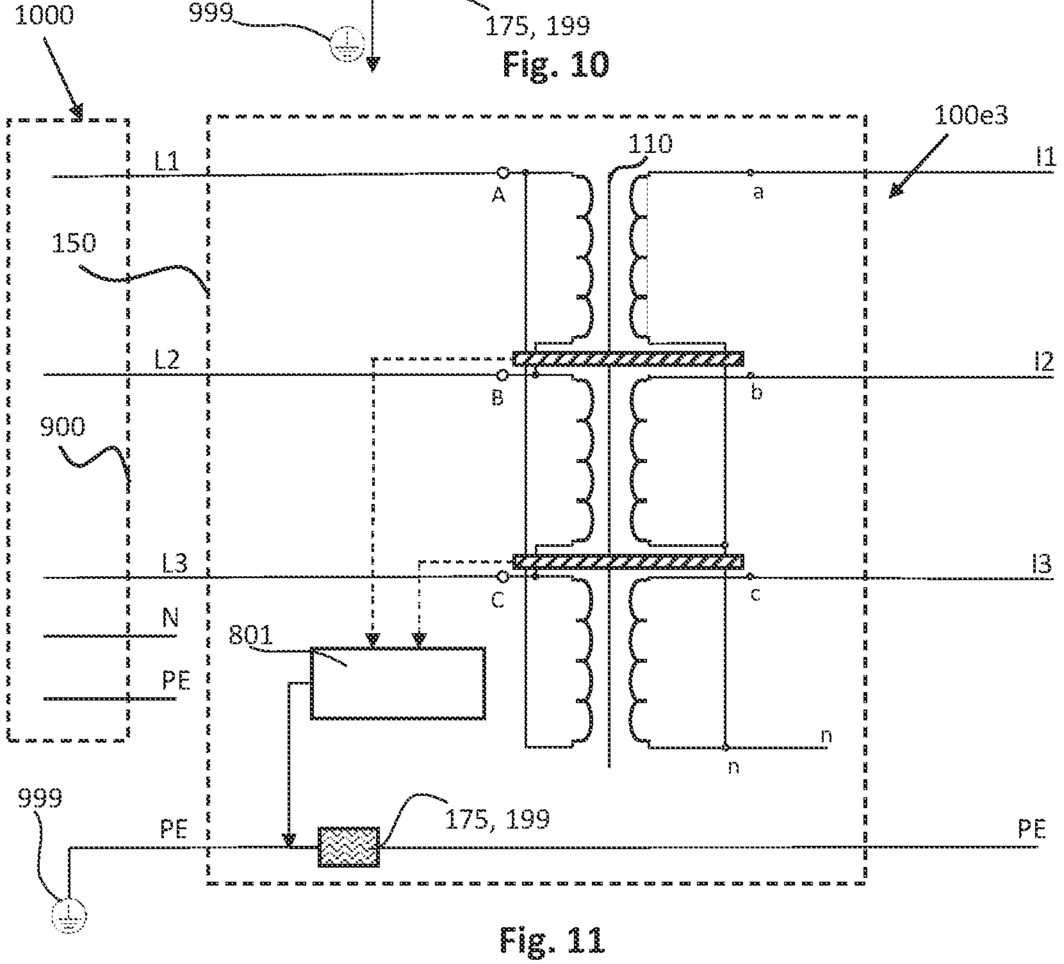
FIG. 11 illustrates how the low-EMI transformer of the invention is preferably connected to the electric power grid.

FIG. 11 illustrates how the low-EMI transformer 100*e*3 of the invention is preferably connected to the electric power grid. In this figure the third embodiment is taken as example. The same principles equally apply to other embodiments. The transformer 100*e*3 is coupled to an electric power grid 900, which offers three phases L1, L2, L3, a neutral N and a ground terminal PE as illustrated. The neutral N and the ground terminal PE are preferably not used in the transformer 100*e*3. Instead, the transformer 100*e*3 in accordance with the invention effectively defines its own clean ground by using a dedicated earthing 999 as illustrated. Such earthing may be formed by locally implementing an earth rod or ground spear 999 and thereby defines a new ground reference. Sometimes such earth rods or ground spears 999 are shared between neighbouring buildings. The inventors realized that for achieving the best effect of the invention a dedicated earthing 999 should be provided for the transformer. In this way the ground potential PE will be kept the cleanest (i.e., the least noise and EMI).

Figure 12:
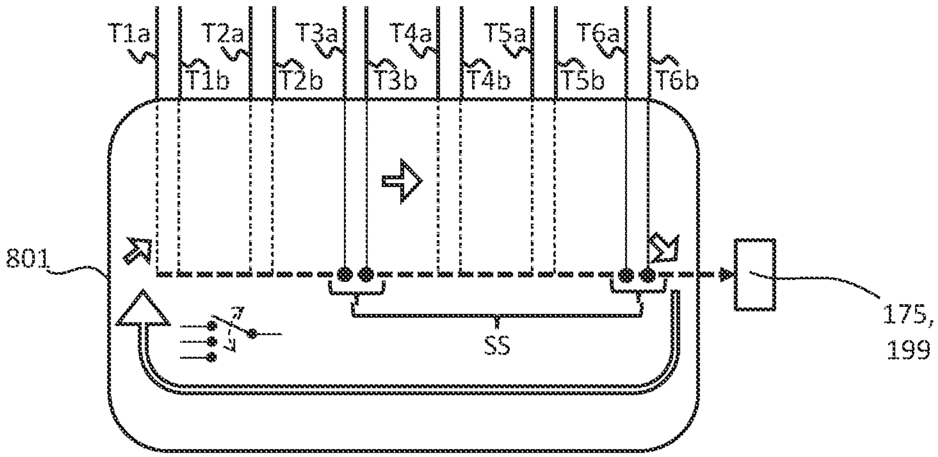
FIG. 12 illustrates further aspects connected to the invention concerning the connection of the loops.

FIG. 12 illustrates further aspects connected to the invention concerning the connection of the loops. The figure shows the switching circuit 801, which forms a very important ingredient of the invention. As already was mentioned before, the invention requires at least two electrically-conductive loops that are placed within the transformer at locations where a magnetic field may be built up during operational use. It was also already mentioned that a suitable location would be the space between the respective phases (legs of the transformer). The embodiment illustrate in FIG. 12 comprises 6 loops, each loops having a respective pair of loop terminals. FIG. 12 shows a first pair of loop terminals T1*a*, T1*b* belong to the first electrically-conductive loop CL1 (FIG. 7), a second pair of loop terminals T2*a*, T2*b* belong to the second electrically-conductive loop CL2 (FIG. 7), a third pair of loop terminals T3*a*, T3*b* belong to the third electrically-conductive loop CL3 (FIG. 7), a fourth pair of loop terminals T4*a*, T4*b* belong to the fourth electrically-conductive loop CL4 (FIG. 7), a fifth pair of loop terminals T5*a*, T5*b* belong to the second electrically-conductive loop CL5 (FIG. 7), and a sixth pair of loop terminals T6*a*, T6*b* belong to the second electrically-conductive loop CL6 (FIG. 7).

The switching circuit 801 of the invention is to be configured for sequentially electrically coupling subsets SS of the loops to the respective physical electrical ground node 175. Such subset may comprise only one loop, but it is also possible to couple two or more loops simultaneously with the physical electrical ground node 175. Coupling a specific loop with the ground node 175 means that both its terminals are connected to the same, thus electrically closing the loop. Any EMI that was built up is effectively led away via the ground node 175 in this way.

In the embodiment of FIG. 12 the choice was made for coupling two loops simultaneously (in the state of FIG. 12 loop 3 and 6 are simultaneously connected) with the physical electrical ground node 175, and then make this selection cycle through the available of loops. However, the inventors discovered that it is not necessary to keep continuously couple loops with the ground node 175. There may be significant pauses in between the time periods that loops are coupled. The selection of subsets of loops and the sequence and pattern of connecting them to the ground node 175 can be experimented with in order to find the most optimal solution, that is the best performance of the transformer. One way of determining this performance is to determine the power factor, and another way is to determine the temperature of the transformer. A higher power factor indicates a better performance (lower losses). In addition, a lower operating temperature indicates lower losses.

It must be noted that with the physical configuration of the plates 800-1, 800-2 and loops as shown in FIG. 8, by experimenting, the inventors found the following sequence to deliver a very good performance (high power factor and lowest temperature):

First the first loop CL1 and the fourth loop CL4 are both connected to the ground node 175 for 5 seconds.

Then there is a pause of 20 minutes.

Then the second loop CL2 and the fifth loop CL5 are both connected to the ground node 175 for 5 seconds.

Then there is another pause of 20 minutes.

Then the third loop CL3 and the sixth loop CL6 are both connected to the ground node 175 for 5 seconds.

Then there is another pause of 20 minutes.

And then the sequence starts all over, which is also illustrated by the arrows in FIG. 12.

It must be stressed that there are numerous ways of making a switching circuit 801 as shown in FIG. 12. The inventors made this circuit as a time-controlled-relay, but that is just one of the possible implementations.

It must also be stressed that the invention is by no means limited to the above-mentioned sequence. Without a doubt more experimenting may lead to other sequences and pattern (time schedule). In addition, the most optimal sequence and pattern will also heavily depend on the physical design of the transformer and thus depend on numerous design parameters.

The inventors built a prototype of an embodiment of a transformer in accordance with the invention, which implements the sequence as discussed earlier. The transformer was built from 250 kVA, IEC 60076-11 transformer as for instance available from supplier Trafox. The transformer is a three phase transformer having a core with three legs, wherein each leg is provided with a respective primary and secondary coil, wherein said coils are placed concentrically (the secondary side on the outside). A minimum distance between the respective outer coils is 1.5 cm. The height of the coils (measured in the direction of the legs of the magnetizable core) is about 80 cm. In between the coils respective plates are placed having a height dimension of 80 cm, a depth of 30 cm and a thickness of about 1 cm. Both plates comprise three electrically-conductive loops placed side by side and distributed over the height of the plate. The minimum distance between the outer loops and the top and bottom end of the plates is 11 cm. The minimum distance between the first loop and the second loop is around 11 cm. The minimum distance between the third loop and the third loop is 11 cm. The enclosed area of each loop is about 60 $cm^2$. The plates are wrapped in carbon. The electrically-conductive loops are made of copper wire. It must be stressed that the prototype disclosed above is just one working embodiment. Many variations, optimizations and adjustments are possible, during further development of this product.

Figure 13:
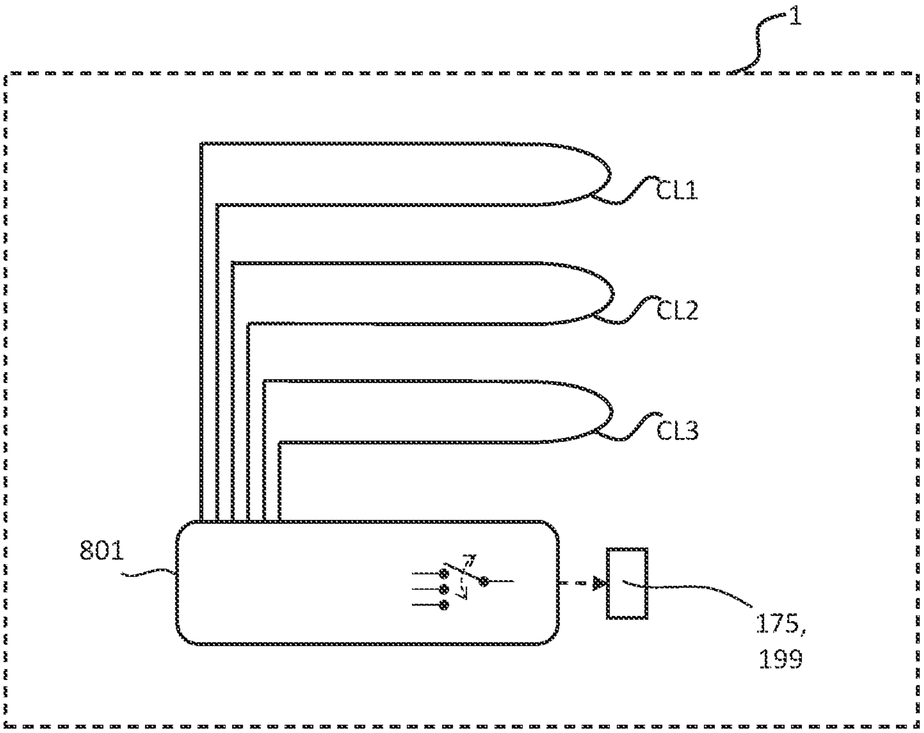
FIG. 13 shows a much broader application of the invention also connected to a method in accordance with the invention.

FIG. 13 shows a much broader application of the invention also connected to a method in accordance with the invention. The inventors realized that the general idea of catching EMI with electrically-conductive loops CL1 . . . . CL3 and leading it away towards the ground node 175 may be applied more broadly. This figure serves to illustrate this more general method of improving performance of an electric or electronic device 1. EMI is a problem, which has become more and more profound over the years. EMI may be generated from external sources, i.e., outside the respective device, but also be generated by the device itself. In other words, the applicability of the steps of method as mentioned in claim 15 may be broadly applied, even outside the technical field of transformers. The applicant is entitled to protection against any such application of the method of the invention. It goes without saying that the protection also extends towards any such electric or electronic device having such features built in.

All the embodiments disclosed in the Figures and discussed so far focus on time-steered selection of the loops. As an alternative embodiment it is possible to implement voltage-steered selection, i.e., to select the loop or loops which actually carry a largest induced-voltage and connect that loop or those loops to the physical electrical ground node to remove EMI.

As a further embodiment it is possible to implement temperature-steered selection, i.e., to select the loop or those loops which have the highest temperature and connect that loop or those loops to the physical electrical ground node to remove EMI.

The particular embodiments disclosed above are illustrative only, as the invention may be modified and practiced in different but equivalent manners apparent to those skilled in the art having the benefit of the teachings herein. For example, the method steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage. In the device claim enumerating several means, several of these means may be embodied by one and the same item of hardware.

The invention claimed is:

1. A transformer comprising:

a magnetizable core;

at least one primary coil and at least one secondary coil provided around the magnetizable core;

a ground terminal for electrically connecting to an external ground terminal, a physical electrical ground node placed at a location within the transformer, wherein the physical electrical ground node is electrically connected to the ground terminal, at least two electrically-conductive loops that are placed at different locations in the transformer where a magnetic field may be built up during operational use, and a switching circuit configured to electrically couple subsets of the at least two electrically-conductive loops with the physical electrical ground node, the coupling being performed temporarily and selectively for each subset of the at least two electrically-conductive loops and in accordance with a predetermined sequence and pattern.

2. The transformer according to claim 1, wherein the at least two electrically-conductive loops comprise at least three electrically-conductive loops.

3. The transformer according to claim 2, wherein the at least two electrically-conductive loops comprise at least six electrically-conductive loops.

4. The transformer according to claim 1, wherein the least two electrically-conductive loops are placed in spaces between the coils.

5. The transformer according to claim 1, wherein the at least two electrically-conductive loops are integrated in a plate or multiple plates being laminated with a material that is permeable to magnetic fields and electrically insulating.

6. The transformer according to claim 1, wherein the subsets of said at least two electrically-conductive loops constitute pairs of electrically-conductive loops.

7. The transformer according to claim 1, wherein the predetermined sequence and pattern covers all of the at least two electrically-conductive loops.

8. The transformer according to claim 1, wherein the predetermined sequence and pattern constitutes a predefined order of selection of subsets of the at least two electrically-conductive loops.

9. The transformer according to claim 1, wherein the predetermined sequence and pattern constitutes a random order of selection of subsets of the at least two electrically-conductive loops.

10. The transformer according to claim 1, wherein the magnetizable core is disconnected from the ground terminal, floating, and electrically isolated from all externally-accessible parts of the transformer.

11. The transformer according to claim 1, further comprising three sets of coils, each set comprising at least one primary coil and at least one secondary coil for forming a three-phase transformer.

12. The transformer according to claim 11, wherein the magnetizable core comprises at least three legs, at least one for each pair of primary and secondary coils.

13. The transformer according to claim 1, further comprising a Faraday cage in which the magnetizable core, the respective coils and the at least two electrically-conductive loops are placed, wherein the Faraday cage is electrically connected with the physical electrical ground node.

14. The transformer according to claim 2, wherein the least two electrically-conductive loops are placed in spaces between the coils.

15. The transformer according to claim 2, wherein the at least two electrically-conductive loops are integrated in a plate or multiple plates being laminated with a material that is permeable to magnetic fields and electrically insulating.

16. The transformer according to claim 4, wherein the at least two electrically-conductive loops are integrated in a plate or multiple plates being laminated with a material that is permeable to magnetic fields and electrically insulating.

17. The transformer according to claim 1, wherein the predetermined sequence and pattern comprises time-steered selection, voltage-steered selection, or temperature-steered selection of the subsets of the at least two electrically-conductive loops based on time, voltage, or temperature, respectively.

18. The transformer according to claim 17, wherein the time-steered selection comprises:

a predetermined selection sequence that specifies an order in which the subsets of the at least two electrically-conductive loops are electrically coupled with the physical electrical ground node; and a predetermined selection pattern that specifies:

a first amount of time that each subset of the least two electrically-conductive loops is to be temporarily electrically coupled with the physical electrical ground node; and a second amount of time during which all of the at least two electrically-conductive loops are electrically disconnected from the ground terminal wherein the voltage-steered selection comprises:

a predetermined selection sequence that specifies that an electrically conducting loop of the at least two electrically-conductive loops which carries a largest induced-voltage is to be electrically coupled with the physical electrical ground node and any electrically conducting loop of the at least two electrically-conductive loops which does not carry the largest induced-voltage is to remain electrically disconnected from the ground terminal; and wherein the temperature-steered selection comprises:

a predetermined selection sequence that specifies that an electrically conducting loop of the at least two electrically-conductive loops which has a highest temperature is to be electrically coupled with the physical electrical ground node and any electrically conducting loop of the at least two electrically-conductive loops which does not have the highest temperature is to remain electrically disconnected from the ground terminal.

* * * * *